United States Patent
Gardner et al.

(10) Patent No.: US 10,450,755 B2
(45) Date of Patent: Oct. 22, 2019

(54) ATTACHING HOOK FILM TO INSULATION BOARD

(71) Applicant: CARLISLE CONSTRUCTION MATERIALS, LLC, Carlisle, PA (US)

(72) Inventors: Robert Gardner, Mechanicsburg, PA (US); Matthew Baker, Beacon, NY (US); Steven Seiler, Carlisle, PA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 0 days.

(21) Appl. No.: 16/261,064

(22) Filed: Jan. 29, 2019

(65) Prior Publication Data

US 2019/0242135 A1     Aug. 8, 2019

Related U.S. Application Data

(60) Provisional application No. 62/626,477, filed on Feb. 5, 2018, provisional application No. 62/736,245, filed on Sep. 25, 2018.

(51) Int. Cl.
*B29C 65/48* (2006.01)
*B29C 65/56* (2006.01)
(Continued)

(52) U.S. Cl.
CPC .............. *E04D 5/145* (2013.01); *E04B 7/22* (2013.01); *E04D 5/148* (2013.01); *F16B 1/00* (2013.01);
(Continued)

(58) Field of Classification Search
CPC ....... B29C 65/48; B29C 65/56; B29C 65/562; B29C 65/72; B29C 65/76; B29C 66/41; B29C 66/43; B29C 66/727; B29C 44/30; B29C 44/326; B29C 44/32; B29C 44/1271; B29C 44/306; B29C 44/468; B32B 5/18; B32B 2419/06; B32B 2038/0084;
(Continued)

(56) References Cited

U.S. PATENT DOCUMENTS 4,764,420 A     8/1988     Gluck et al.
4,996,812 A     3/1991     Venable
(Continued)

FOREIGN PATENT DOCUMENTS

DE     202010009133 U1     8/2011

OTHER PUBLICATIONS

International Searching Authority, International Search Report and Written Opinion for corresponding International Application No. PCT/US2019/015659, dated Apr. 15, 2019, 8 pages.

*Primary Examiner* — Philip C Tucker
*Assistant Examiner* — Brian R Slawski
(74) *Attorney, Agent, or Firm* — Gordon Rees Scully Mansukhani LLP; David R. Heckadon

(57) ABSTRACT

Methods for attaching a layer of hook fasteners onto an insulation board for use attaching a roofing membrane having fleece backed loops thereon such that the roofing membrane can be held onto the insulation membrane by: adhering the hook layer onto portions of the top or bottom facer of an insulation board after the insulation board has exited a laminator; or adhering the hook layer onto the top or bottom facer prior to entry into the laminator; or replacing the top or bottom facer of the insulation board with the hook layer before use in the laminator.

22 Claims, 10 Drawing Sheets

(51) Int. Cl.
   *B29C 65/72*  (2006.01)
   *B29C 65/76*  (2006.01)
   *B29C 65/00*  (2006.01)
   *B32B 5/18*   (2006.01)
   *B32B 37/00*  (2006.01)
   *E04D 3/35*   (2006.01)
   *E04D 5/14*   (2006.01)
   *E04B 7/22*   (2006.01)
   *F16B 1/00*   (2006.01)

(52) U.S. Cl.
   CPC .............. *B29C 65/48* (2013.01); *B29C 65/56* (2013.01); *B29C 65/72* (2013.01); *B29C 65/76* (2013.01); *B29C 66/43* (2013.01); *B29C 66/727* (2013.01); *B32B 5/18* (2013.01); *B32B 2307/304* (2013.01); *F16B 2001/0028* (2013.01)

(58) Field of Classification Search
   CPC ... B32B 2307/304; B32B 5/245; E04C 2/243; E04C 2/284; E04C 2/296; E04D 5/146; E04D 3/02; E04D 3/18; E04D 3/351; E04D 3/352; E04D 3/355; E04D 3/36; E04D 3/3605; E04D 3/358; E04D 3/3601; E04D 3/3602; Y10T 428/24017
   USPC ...... 156/60, 66, 71, 77, 78, 91, 242, 244.11, 156/297, 299, 302, 304.1, 304.2, 304.5, 156/305, 324; 52/309.8, 309.9, 408, 52/741.4, 746.1, 746.11
   See application file for complete search history.

(56) References Cited

U.S. PATENT DOCUMENTS

| | | | |
|---|---|---|---|
| 5,144,786 A | 9/1992 | Pacione | |
| 5,172,504 A | 12/1992 | De Maat et al. | |
| 5,456,785 A | 10/1995 | Venable | |
| 5,725,704 A * | 3/1998 | Gallagher | B32B 5/18 156/66 |
| 5,737,897 A | 4/1998 | Naipawer, III | |
| 5,981,030 A | 11/1999 | Haupt et al. | |
| 6,093,354 A | 7/2000 | Hubbard et al. | |
| 6,093,481 A | 7/2000 | Lynn et al. | |
| 6,679,018 B2 | 1/2004 | Georgeau et al. | |
| 6,742,313 B2 | 6/2004 | Ritland et al. | |
| 6,866,732 B2 | 3/2005 | Hubbard et al. | |
| 6,938,386 B2 | 9/2005 | Ritland et al. | |
| 7,169,719 B2 | 1/2007 | Mehta et al. | |
| 7,776,172 B2 | 8/2010 | Tonohara | |
| 7,785,703 B2 | 8/2010 | Agrawal | |
| 8,701,367 B2 | 4/2014 | Georgeau et al. | |
| 8,833,037 B2 | 9/2014 | French et al. | |
| 9,163,410 B2 | 10/2015 | French et al. | |
| 9,637,926 B2 | 5/2017 | Kraus, Jr. et al. | |
| 9,752,326 B2 | 9/2017 | Kraus, Jr. et al. | |
| 2003/0070391 A1 * | 4/2003 | Tachauer | A44B 18/0049 52/745.21 |
| 2005/0284065 A1 | 12/2005 | Shaffer | |
| 2006/0110572 A1 * | 5/2006 | Herrero | A44B 18/0049 428/100 |
| 2007/0094963 A1 | 5/2007 | McDonald et al. | |
| 2009/0255201 A1 * | 10/2009 | Kraus, Jr. | B29C 39/18 52/309.5 |
| 2011/0059303 A1 | 3/2011 | Gernot et al. | |
| 2014/0356568 A1 | 12/2014 | Berard et al. | |
| 2015/0144421 A1 | 5/2015 | Becker et al. | |
| 2017/0015027 A1 | 1/2017 | Letts et al. | |
| 2017/0044406 A1 | 2/2017 | Hubbard et al. | |
| 2017/0210091 A1 | 7/2017 | McJunkins et al. | |
| 2017/0268143 A1 | 9/2017 | Paradis et al. | |
| 2017/0298630 A1 | 10/2017 | Hubbard | |

* cited by examiner

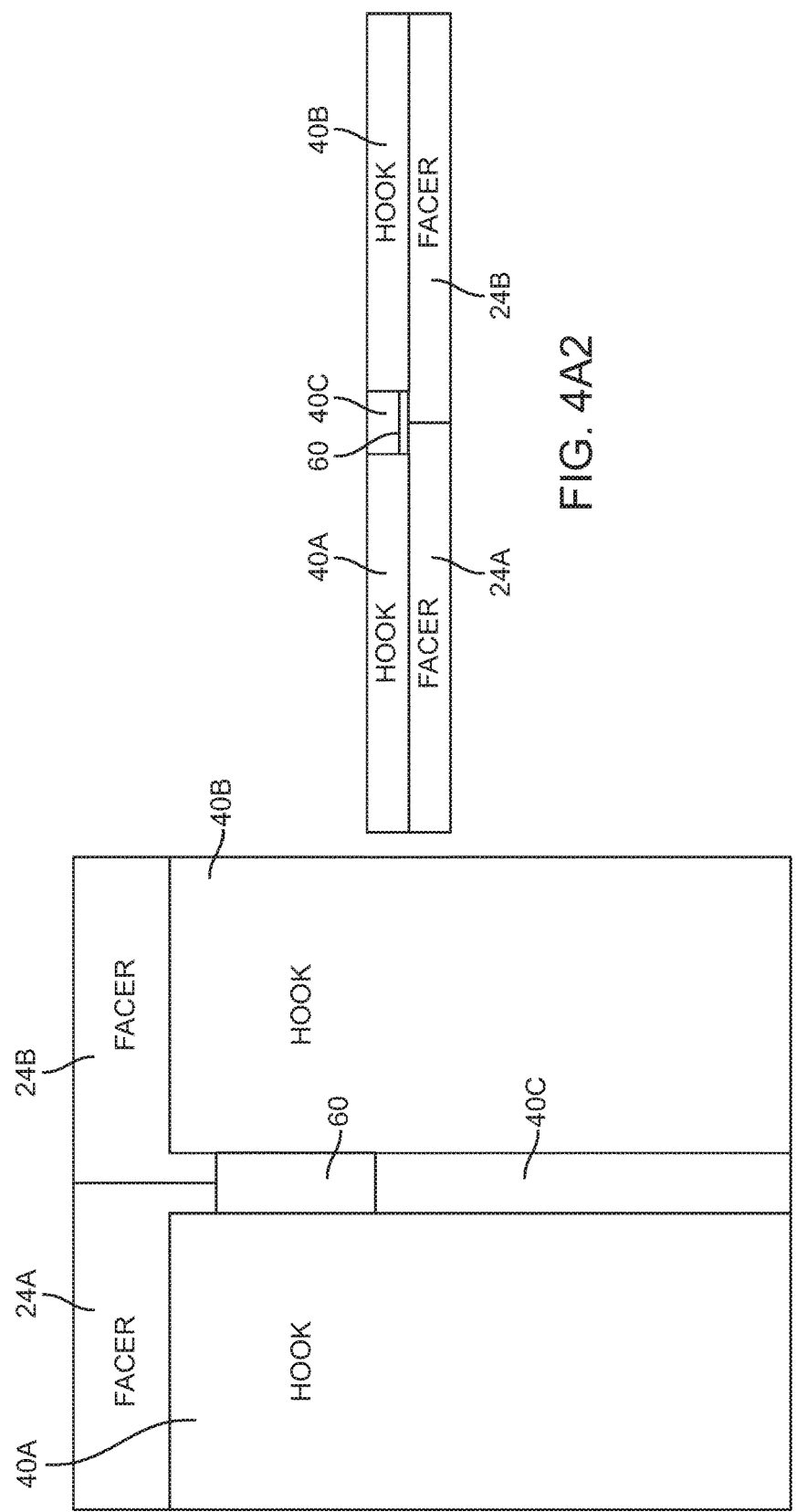

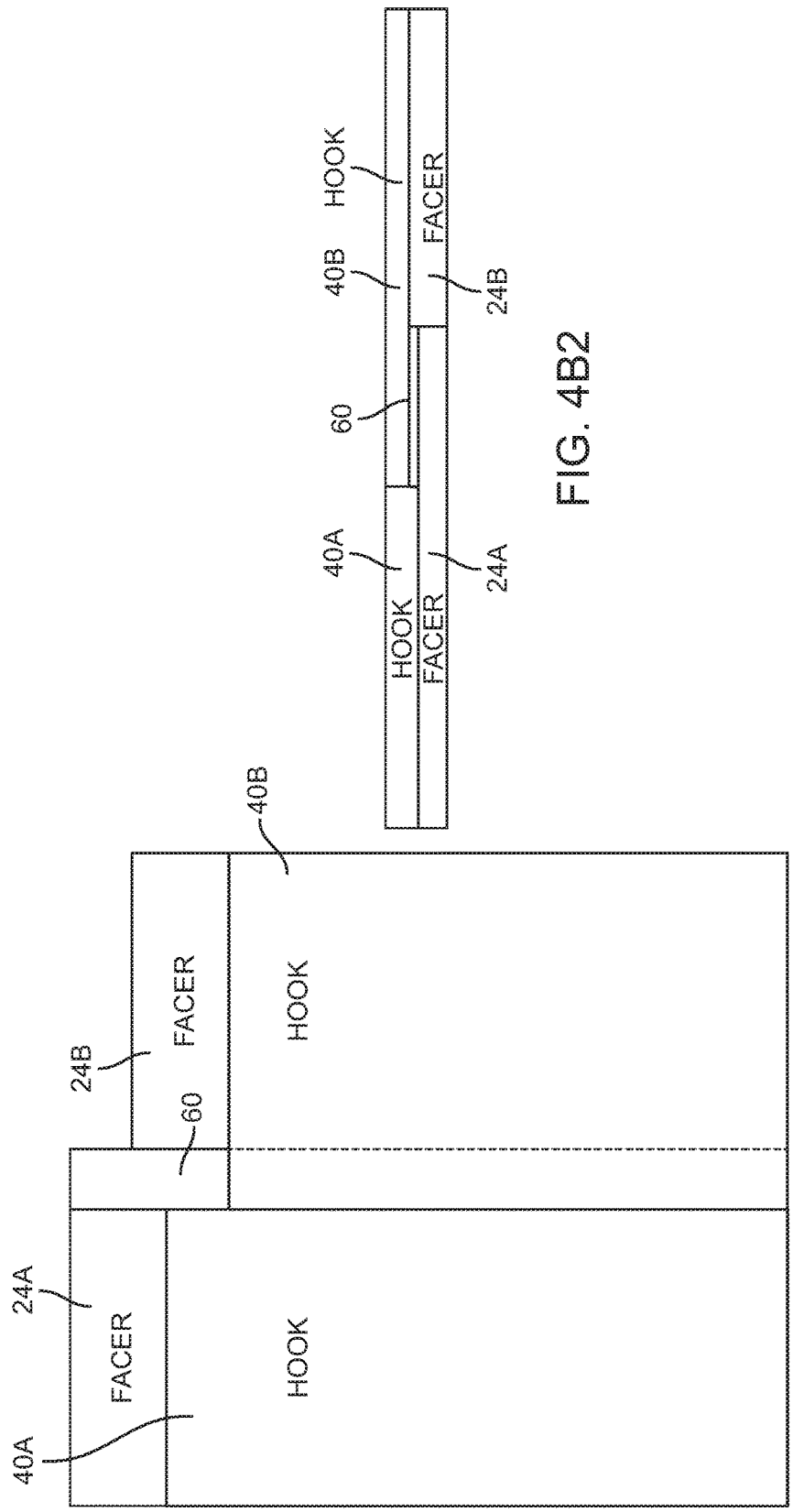

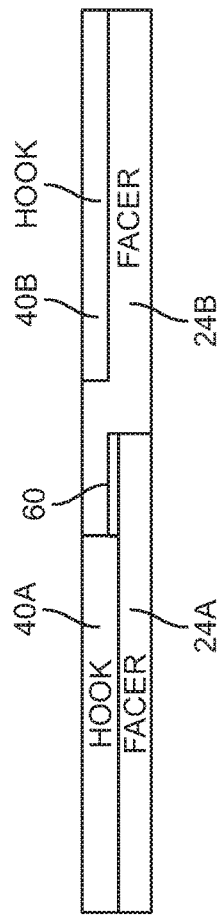
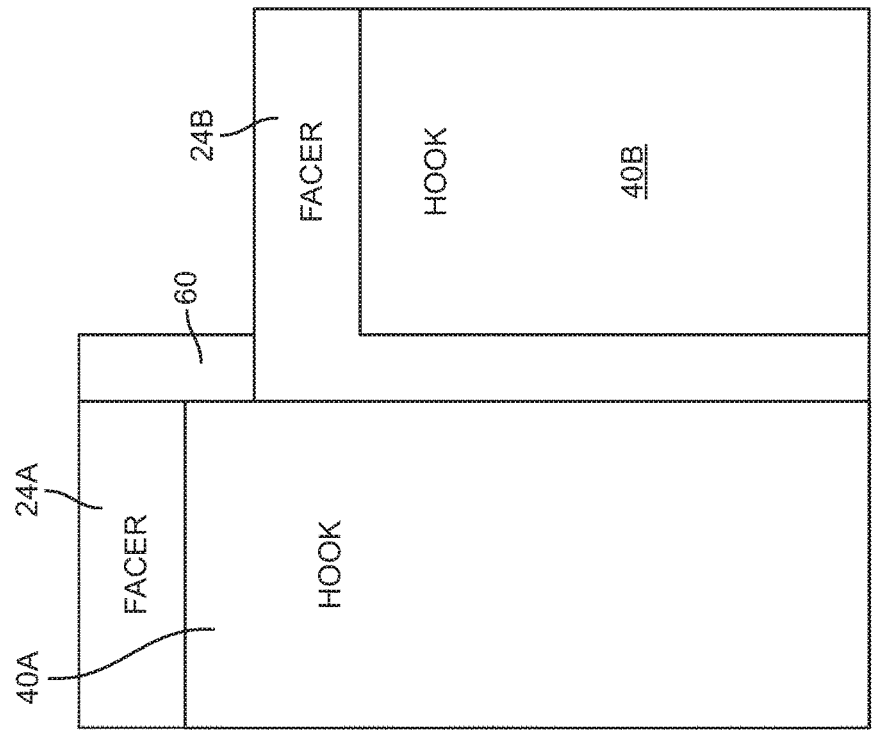
FIG. 4C2
FIG. 4C1

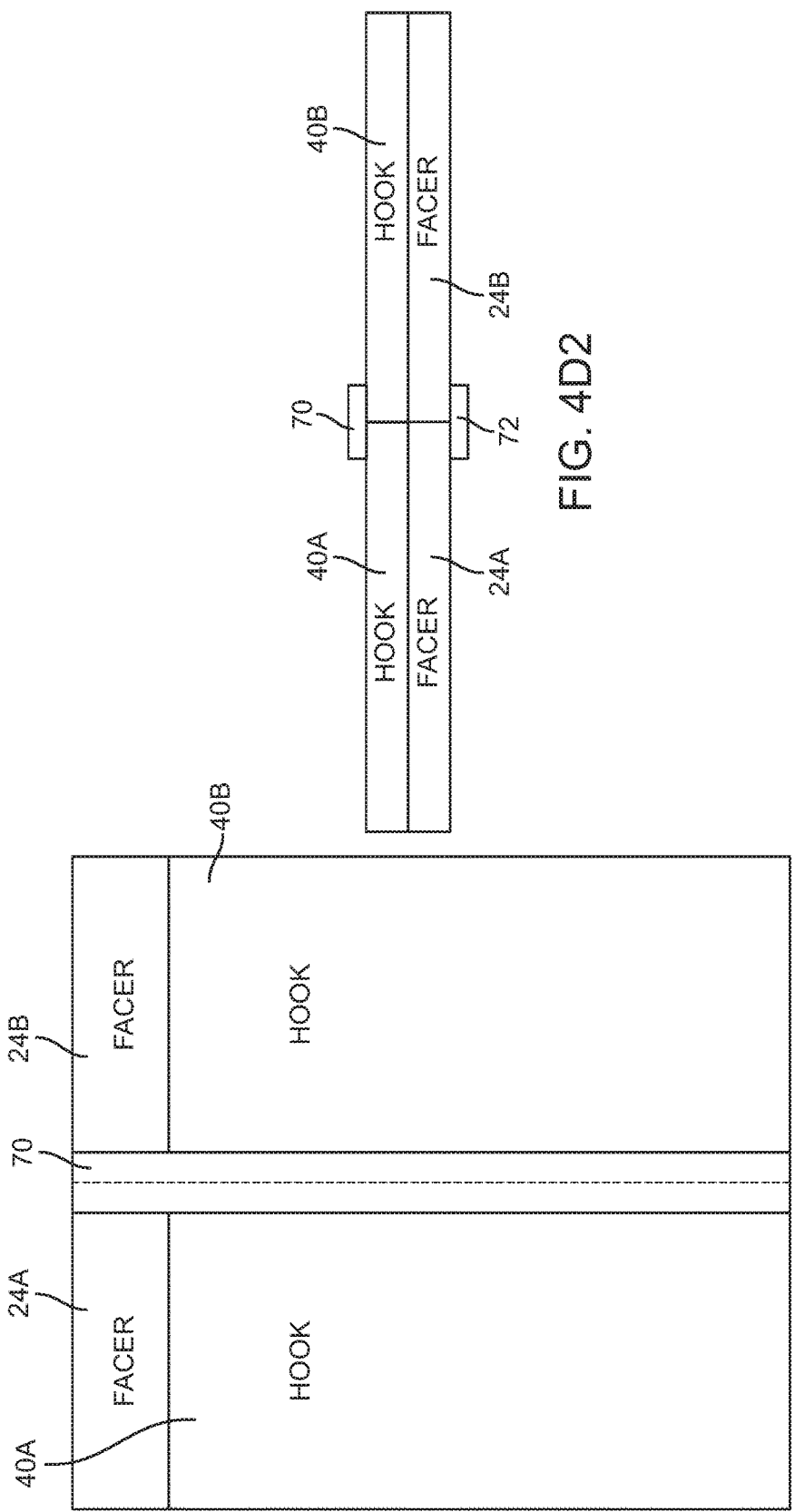

ATTACHING HOOK FILM TO INSULATION BOARD

RELATED APPLICATIONS

The present application claims priority to U.S. Provisional patent application 62/626,477 of same title, filed Feb. 5, 2018 and to U.S. Provisional patent application 62/736,245 of same title, filed Sep. 25, 2018, the entire disclosures of which are incorporated herein by reference in their entireties for all purposes.

TECHNICAL FIELD

The present invention relates to systems for attaching a layer of hook fasteners onto the top of a building insulation board.

BACKGROUND OF THE INVENTION

Roofing membranes are applied on top of roof insulation boards to protect the roof insulation boards or roof deck surface/substrate, and provide a layer of waterproofing. Typically, these roofing membranes are made of EPDM, TPO, PVC or other waterproofing materials. Lately, such roofing membranes have been coated or laminated with fleece backings as a way to provide toughness, durability, strength and mechanical stiffness to the roofing membrane itself. In addition, such fleece back roofing membranes have the advantage of withstanding extreme weather conditions (such as wind uplift and hail). An example of a fleece backed roofing material is the FleeceBACK® roofing membrane product line manufactured by Carlisle Construction Materials LLC of Carlisle, Pa.

In recent approaches, these fleece backed roofing membranes may be attached to the insulation boards using hook and loop fasteners (for example, Velcro®). Specifically, the fleece backing on the roofing membrane forms the "loop" layer and the "hook" layer can be a Velcro® hook layer (or any other hook layer manufactured by any other company) that is pre-attached onto the insulation boards. An advantage of this method is that the roofing membrane can be attached to the insulation boards without using a messy layer of adhesives. The installation job can therefore be done quickly, cleanly and easily.

Unfortunately, it has proven somewhat challenging to simply apply a hook layer onto a standard insulation board. This is because simply gluing the hook layer onto the top of the insulation boards (prior to shipment to a jobsite) is quite costly and can have production capacity constraints. Moreover, attempts at combining a Velcro® (or any other) hook layer to the insulation board in a traditional manufacturing can result in situations where the insulation board does not stay flat and the polyisocyanurate foam doesn't naturally/readily bond to the hook film. Specifically, problems can include warpage both down the length of the insulation board and across the width of the insulation board. Another problem with combining the hook layer onto the insulation board on the traditional polyiso online lamination process is cutting the combined insulation board and hook layer since the cutting process tends to fray the edges of the hook layer along the sides of the insulation board and/or melt the thermoplastic hook film polymer onto the mechanical saw blades traditionally used in insulation production processes.

In contrast, the present methods and systems provide easy and clean ways to attach the hook layer directly onto the insulation boards. These novel processes both save time and money. In addition, the present methods attach the hook layer onto the cured insulation board in a way such that the insulation board remains flat after the hook layer has been attached. Thus, the effect of wrinkling is minimized.

SUMMARY OF THE INVENTION

The present system provides different preferred methods for attaching a layer of hook fasteners onto an insulation board. A first preferred method attaches hook film (with preferably partial coverage) to a facer on the polyiso production line. A second preferred method attaches the hook film to the facer by a third-party converter. A third preferred method attaches the hook film directly to the polyiso foam, thereby replacing one of the traditional facing materials. (It is to be understood that the present methods can be used for materials other than just Polyisocyanurate (PIR) foam boards. For example, the present methods may also be used with polyurethane insulation materials, phenolic insulation materials, and mineral fiber insulation materials.)

During manufacturing, it may be preferred to manufacture the present assembly with the hook fasteners positioned onto the upwardly facing (i.e.: top) side of the assembly. Alternatively, however, in other cases it may be preferred to manufacture the present assembly with the hook fasteners positioned on the downwardly facing (i.e.: bottom) side of the assembly. In both cases, the hook layers will be facing on top of the insulation board when the final assembly has been positioned on top of the building roof. An advantage of manufacturing the present assembly with the hook layer on top is that it can be easier to saw or cut through. Conversely, an advantage of manufacturing the present assembly with the hook layer on the bottom is that it can be easier for robots (having suction heads) to pick up and move the assembly during the manufacturing process. As such, FIG. 1 shows the final assembly in the field as it would sit on top of a building (i.e.: with the Velcro® at the top), whereas FIGS. 2B and 3 show the manufacture of the assembly with the Velcro® at the bottom, before the assembly has been flipped over for use in the field). As such, it is to be understood that the present methods encompass manufacturing the assembly with the Velcro® hook layer either the top or the bottom side.

In the first preferred method, the layer of hook fasteners is adhered onto the top or bottom facer on the production line. The insulation board is typically just a standard insulation board having both top and bottom facers thereon. An advantage of this first method is its simplicity. Another advantage of this approach is that the adhesive is applied prior to the lamination process. As such, the hook layer can be attached to the facer before the lamination of the insulation foam to the facer, or alternatively after the lamination of the insulation foam to the facers. In addition, the laminator could fully mate the facing material to the hook film.

In some aspects of the first method, the layer of hook fasteners is a plurality of separate narrow strips of hook layer that are positioned side-by-side (i.e.: in the same general plane) with a space or spaces therebetween. As such, the layer of hook fasteners need not cover the entire surface of the insulation boards, all keeping within the scope of the present invention. Rather, the hook fastener layer can even be applied in a "zebra-stripe", diamond, checkerboard, etc. type of pattern, or any other pattern. An advantage of this "partial-coverage" approach is that is uses considerably less hook fastener material (as compared to a "fully-covered" approach where the layer of hook fasteners covers the entire surface of the insulation boards). Another advantage of this striped system of application is that narrow strips of hook film could be less likely to warp the insulation board. Moreover, if the strips do not contact the extreme edge of the board, it may not be required to modify cutting equipment to address fraying or warping on two of the four edges of the board. Also, this approach could provide reference points for fastener attachment when boards are installed on the roof, such to avoid fastening in the hook strips.

In the second preferred method, the layer of hook fasteners is pre-attached onto the top facer roll prior to being laminated onto the insulation board. An advantage of this method is that the responsibility and obligation of combining the hook fastener layer to the facer can fall on a third-party converter. Another advantage is that third-party film converters typically run production line speeds much faster than polyiso manufacturing lines and they have equipment to control adhesive application very accurately. As such, this method should allow polyiso manufacturing lines to operate at normal line speeds.

In the third preferred method, one facer is simply replaced with the layer of hook fasteners. In this approach, the hook film and facer material are simultaneously laminated onto the insulation foam. An advantage of the third method is that that it uses the laminator (to attach the hook fastener layer) at the same time that the laminator is already being used to attach the bottom or top facer. As such, this method also does not add any additional time to the process of manufacturing the insulation boards. This method also does not require the use of adhesive. Thus, it provides a cost effective way to combine materials.

In terms of manufacturing approaches, the second method may be considered to be an "offline" process, whereas the first and third methods can be considered to be "online" processes (since the attachment of the hook layer is done on the same production line that would otherwise be used to attach top and bottom facers to a standard insulation board).

In further preferred aspects, the facer materials are supplied as strips of material that are narrower than a standard insulation board. For example, a standard insulation board may be four feet across, whereas the facers sections may be supplied in two foot wide strips. In addition, the layer of hook fasteners (e.g.: including, but not limited to, Velcro®) may also be supplied in strips that are narrower than a standard insulation board.

Accordingly, optional techniques are provided herein for securing parallel (i.e.: side-by-side) sections of hook fasteners to parallel (i.e.: side-by-side) facer sections. In various approaches, the parallel hook layer strips may be: (i) adhered together side-by-side onto the facer sections with an intermediate hook layer strip therebetween; (ii) laid down on the facer sections with overhanging ends held together by an adhesive layer; (iii) laid down on the facer sections with overlapping ends held together by an adhesive layer; and/or (iv) taped together with hook and loop tape or with adhesive tapes.

In its various embodiments, the insulation board can be a Polyisocyanurate (PIR) foam board, and the facer(s) can optionally be glass reinforced facers, coated glass facers, non-coated glass facers, foil facers, kraft paper facers, polymeric facers, rigid substrates similar but not limited to OSB, Plywood, gypsum, coverboards, etc. An advantage of using kraft paper facers or polymeric facers is that it may be easier to extrude a hook layer onto these materials than onto glass reinforced facer materials.

BRIEF DESCRIPTION OF THE DRAWINGS

FIG. 4A1 is a top plan and corresponding FIG. 4A2 is a side elevation view of a method of applying hook layer strips onto side-by-side facer sections using an intermediate hook layer strip adhered to both facer strips.

FIG. 4B1 is a top plan and corresponding FIG. 4B2 is a side elevation view of a method of applying hook layer strips onto side-by-side facer sections with the side edges of the hook layer strips being offset from the side edges of the facer sections.

FIG. 4C1 is a top plan and corresponding FIG. 4C2 is a side elevation view of a method of applying hook layer strips onto side-by-side facer sections with the edge of one facer section overlapping the other facer section.

FIG. 4D1 is a top plan and corresponding FIG. 4D2 is a side elevation view of a method of applying side-by-side hook layer strips onto side-by-side facer sections using a hook and loop tape on the top and an adhesive tape on the bottom.

DETAILED DESCRIPTION OF THE DRAWINGS

Figure 1A:
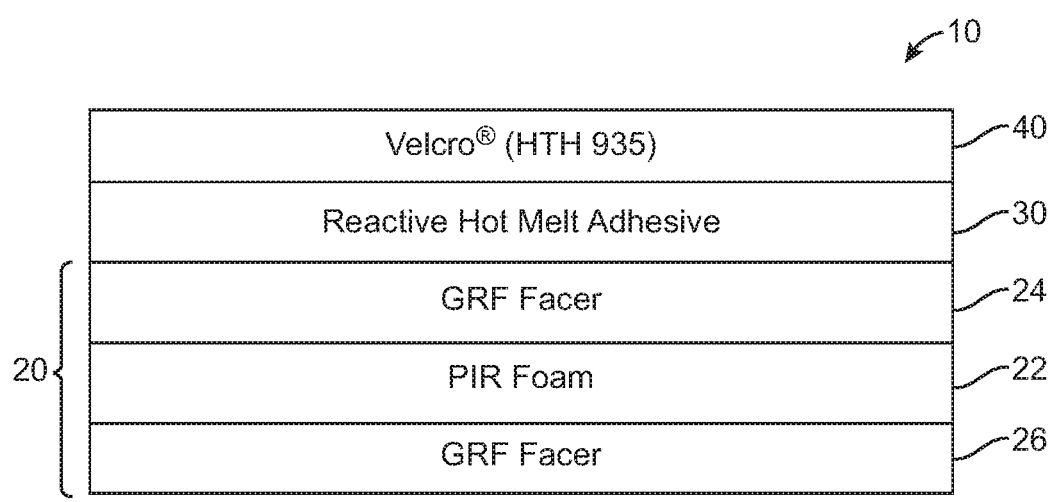
FIG. 1A is a sectional elevation view of the assembly produced by the first method.

FIG. 1A shows a first assembly 10 produced by a first method, as follows. First, a standard insulation board assembly 20 is provided. Insulation board assembly 20 comprises a standard insulation board 22 having a top facer 24 and a bottom facer 26. Next, a hot melt adhesive 30 or other suitable adhesive is spread over the top of top facer 24, and a layer of hook fasteners 40 is applied thereover. In this first "online" method, the layer of hook fasteners 40 is applied either before or after the insulation board assembly has exited a laminator machine.

In preferred aspects, the layer 40 of hook fasteners can be made of a polypropylene film, including, but not limited to, Velcro® HTH935. Insulation board 22 can optionally be made of a polyisocyanurate foam or other suitable insulation materials. Optionally, the top and bottom facers 24 and 26 can be glass reinforced facers, coated glass facers, non-coated glass facers, foil facers, kraft paper facers, polymeric facers, rigid substrates similar but not limited to OSB, Plywood, gypsum, coverboards, etc.

Figure 1B:
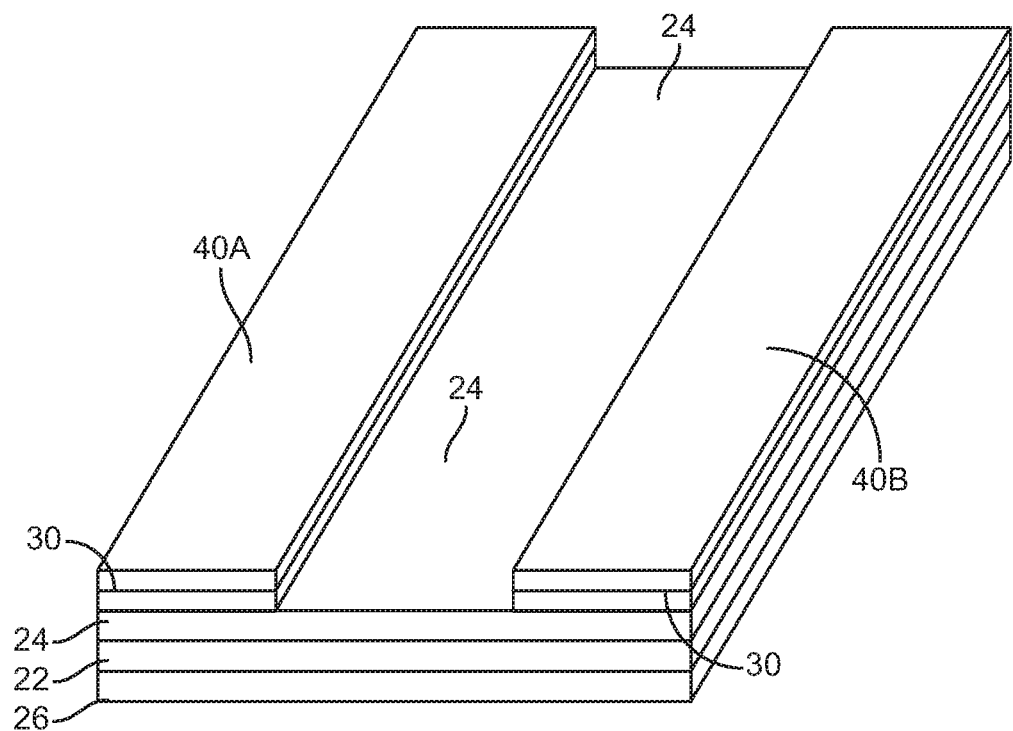
FIG. 1B is a perspective view of the assembly produced by the first method showing the optional use of strips of hook layers sitting side-by-side on the top of the insulation board spaced apart with gaps therebetween.

In optional aspects of the first method, as seen in FIG. 1B, the layer 40 of hook fasteners can be made from a plurality of strips 40A, 40B, etc. of hook fastener layers that are positioned side-by-side one another with sections of adhesive 30 below, as shown.

As can be seen, strips 40A and 40B can be positioned in parallel to one another. It is to be understood, however, that the present invention is not so limited, and that any arrangement or pattern of hook layer materials sitting on top of the top facer 24 is included within the scope of the present invention. In addition, strips 40A and 40B can be positioned with a gap or gaps therebetween. These gaps may be very small through to very large, all keeping within the scope of the present invention. For example, more strips (than illustrated) can be included to give the final product a striped appearance. The advantage of this approach is that it uses less hook layer material 40 than if the entire top facer 24 was instead fully covered with hook fasteners.

Figure 1C:
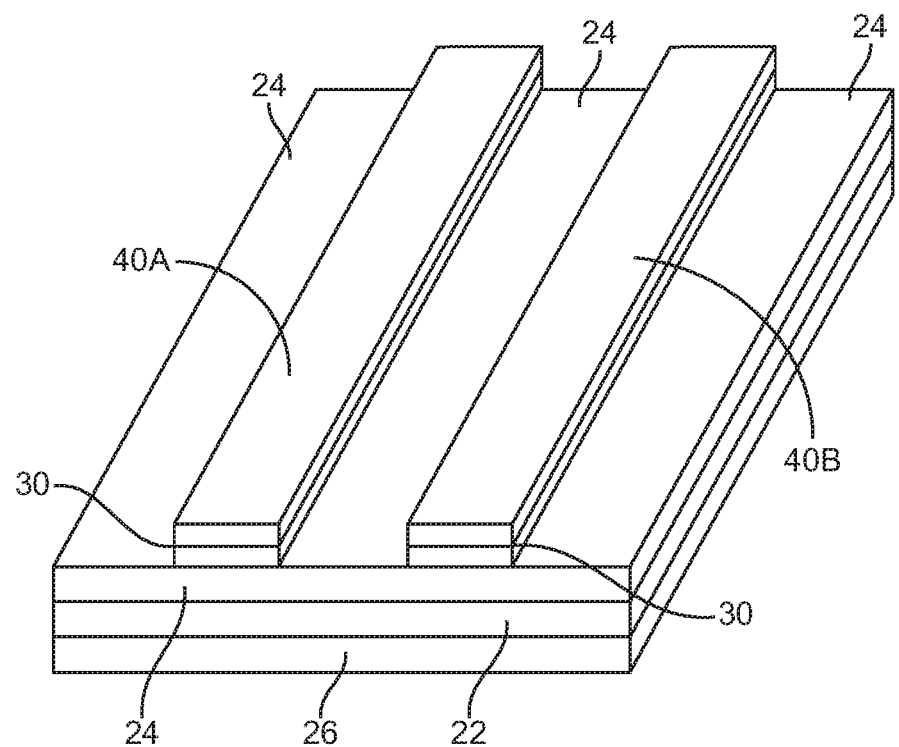
FIG. 1C is another perspective view of the assembly produced by the first method showing the optional use of narrow strips of hook layers on the top of the insulation board, and without the strips being positioned at the side edges of the insulation board.

FIG. 1C shows an embodiment similar to FIG. 1B, but instead using narrower strips 40.

An advantage of the embodiment in FIG. 1C is that it is not necessary to cut the layers 40A and 40B of hook fasteners at the side edges of the insulation board. Instead, the edges of the hook fasteners 40A and 40B can be positioned away from the edges of the top facer 24 Thus, the potential for fraying the sides of hook fastener layers 40A and 40B when sawing or cutting is avoided.

Figure 2A:
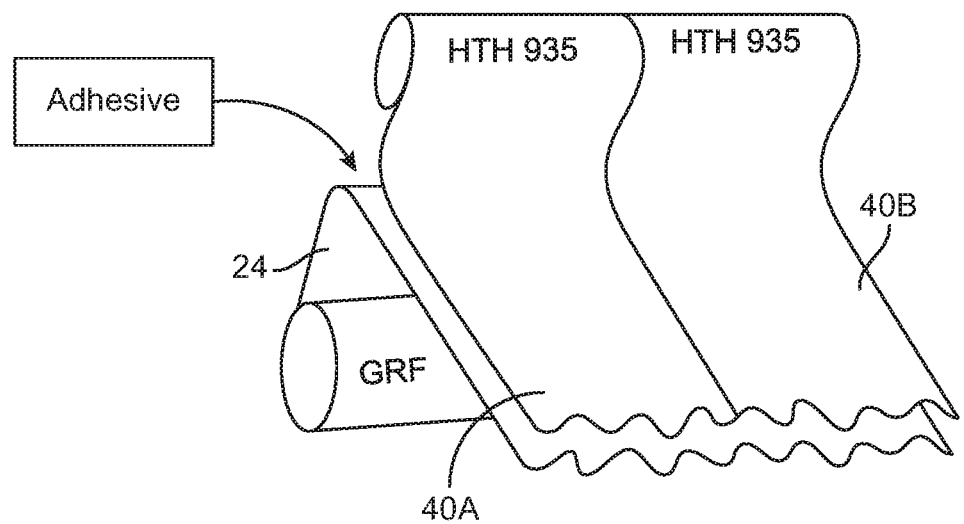
FIGS. 2A and 2B are illustrations of hook layers attached onto the insulation board using the second method. Specifically, FIG. 2A first illustrates side-by-side hook layers attached onto a top facer, and FIG. 2B next illustrates the top facer (with hook layer already adhered thereon), the insulation board and the bottom facer all being laminated together.
Figure 2B:
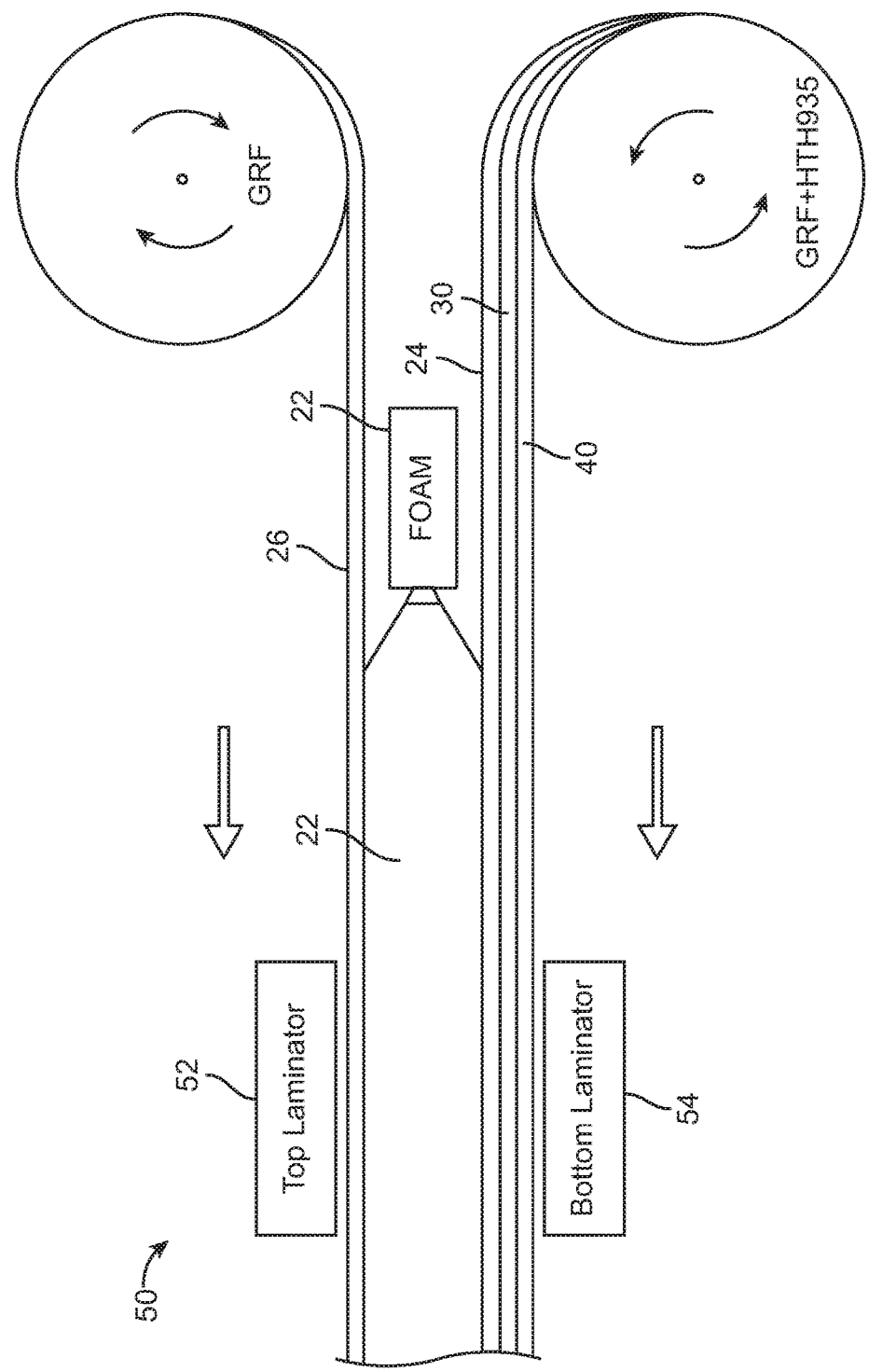

FIGS. 2A and 2B illustrate the hook layer being attached onto the insulation board using the second method, as follows. (Note: FIG. 2A illustrates the Velcro® on the top (upwardly facing) side of top facer 24, whereas FIG. 2B shows the Velcro® flipped over onto the downwardly facing bottom of the assembly during lamination, as follows).

First, top facer 24 is provided and a layer of hook fasteners is adhered thereon. This is clearly seen in FIG. 2A where two side-by-side layers 40A and 40B of hook fasteners are attached onto the top of top facer 24 using adhesive 38. In this illustration, two rolls of layers 40 of hook fasteners are positioned side-by-side with no gaps therebetween. This approach may be used because hook layers are typically manufactured and delivered in sheets that are ½ of the width of a standard insulation board. It is to be understood that a single wide hook layer sheet may be used instead (i.e. one having the same width as the insulation board if such a hook layer sheet is commercially available). Further optional approaches of positioning side by side sections of hook layers onto side by side facer sections are shown in FIGS. 4A to 4C. In FIG. 2B, the combined top facer 24 and hook layer 40A/40B is flipped upside down. As such, top facer 24 is shown positioned at the bottom, and bottom facer 26 positioned at the top. As can be seen in FIG. 2B, after side-by-side layers 40A and 40B of hook fasteners are attached onto top facer 24, then insulation board 22 (which may optionally be PIR Foam), and top facer 24 and bottom facer 26 are all simultaneously passed into laminator 50. Laminator 50 preferably comprises a laminator top portion 52 and a laminator bottom portion 54.

Thus, top facer 24 is placed adjacent to the bottom portion 54 of laminator 50 and bottom facer 26 is positioned adjacent to the top portion 52 of laminator 50. As insulation board 22 and top and bottom facers 24 and 26 simultaneously pass between laminator portions 52 and 54, laminator 50 heats up and thereby seals the top and bottom facers 24 and 26 onto insulation board 22.

Similar to FIG. 1, the layer of hook fasteners 40A and 40B can be made of polypropylene film such as Velcro® HTH935. Insulation board 22 can optionally be made of a polyisocyanurate foam, or other suitable insulation material.

Figure 3:
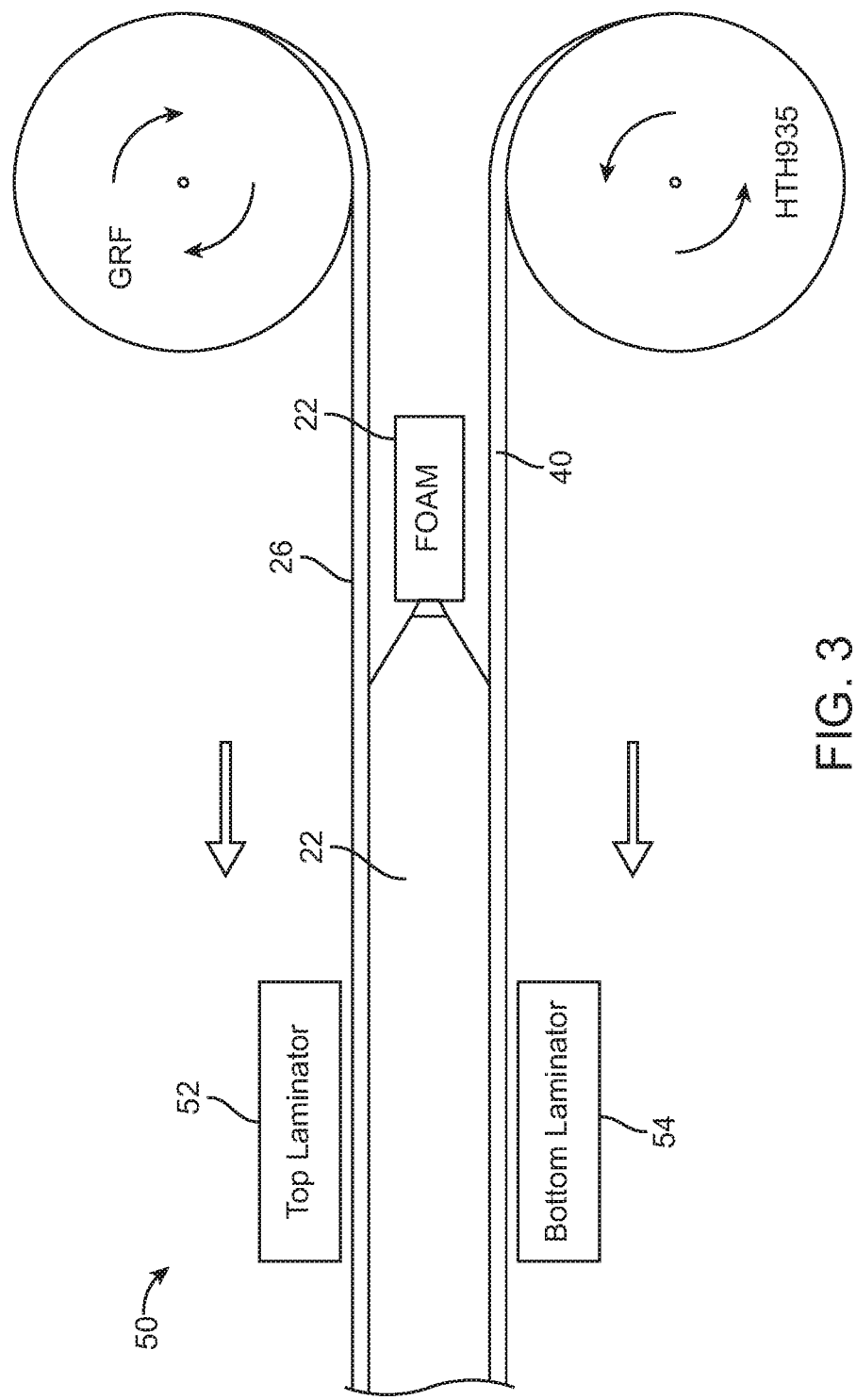
FIG. 3 is an illustration of hook layers attached onto the insulation board using the third method.

FIG. 3 is an illustration of hook layers attached onto the insulation board using the third method, as follows.

First, a bottom facer 26, insulation board 22 (which is optionally a PIR Foam), and a layer 40 of hook fastener material are all simultaneously fed through laminator 50. Laminator 50 preferably comprises a laminator top portion 52 and a laminator bottom portion 54.

Thus, bottom facer 26 is placed adjacent to the top portion 52 of laminator 50 and layer 40 of hook fasteners is positioned adjacent to the bottom portion 54 of laminator 50. As insulation board 22, bottom facer 26 and hook layer 40 simultaneously pass between laminator portions 52 and 54, laminator 50 heats up and thereby bonds, attaches or adheres bottom facer 26 and hook layer 40 onto insulation board 22.

Advantages of the present approaches are that they produce a flat, wrinkle-free insulation board. As a result, other advantages of the present approaches are that they provide insulation board with sufficient physical property performance to meet adhesive and dimensional stability requirements that meet/exceed current needs in the finished commercial roofing assembly.

In the various aspects of the present system discussed above, the facers can be made of different materials. Such films can optionally include PP, PET, PVC, PP, etc. Moreover, generic facers including glass reinforced facer (GRF), or coated glass facer (CGF) which is comprised of a glass mat with a very high surface area advantageously have excellent adhesion to the foam. Optionally, polymeric films can be laminated to a facer that has affinity to the foam insulation. As such, the present invention encompasses various hook films made from all polymeric materials. It is to be understood that any substrate for hook materials is included within the scope of the present invention.

FIGS. 4A1 and 4A2 show a first method of applying hook layer strips 40A and 40B onto side-by-side facer sections 24A and 24B). Specifically, the hook layer strips 40A and 40B are positioned with an intermediate hook layer strip 40C positioned therebetween. Intermediate hook layer strip 40C is adhered with an adhesive layer 60 to facer sections 24A and 24B.

FIGS. 4B1 and 4B2 show a second method of applying hook layer strips 40A and 40B onto side-by-side facer sections 24A and 24B). Specifically, the hook layer strips 40A and 40B are positioned with the side edges of the hook layer strips being offset from the side edges of the facer sections. As such, the side edge of hook layer strip 40B is positioned over the side edge of facer section 24A. An adhesive 60 is used to secure these offset edges together as shown.

FIGS. 4C1 and 4C2 show a third method of applying hook layer strips 40A and 40B onto side-by-side facer sections 24A and 24B. Specifically, an edge of facer section 24B is placed over the top of the edge of facer section 24A. These two edges are held together by an adhesive 60. Next, hook layer strip 40A is positioned over facer section 24A and hook layer strip 40B is positioned over facer section 24B. As can be seen, the edges of hook layers 40A and 40B do not touch one another in this approach.

FIGS. 4D1 and 4D2 show a fourth method of applying hook layer strips 40A and 40B onto side-by-side facer sections 24A and 24B. Specifically, sections of tape (70 and 72) may be applied across the top and bottom of the connection, as shown. In one exemplary embodiment, tape 72 may be a hook and loop tape (e.g.: a strip of loop material that attaches onto hook layer strips 40A and 40B). Tape 72 may be an adhesive tape onto which facer sections 24A and 24B are adhered.

What is claimed is:

1. A method of attaching a layer of hook fasteners onto a top of an insulation board, comprising:

(a) providing a top facer;
(b) adhering the layer of hook fasteners onto the top facer;
(c) providing the insulation board;
(d) providing a bottom facer; and (e) simultaneously passing the insulation board and the top and bottom facers through a laminator, wherein the laminator heats and adheres or attaches the top and bottom facers onto the insulation board:
wherein the layer of hook fasteners comprises a plurality of strips of hook fastener layer material positioned side-by-side one another; and
wherein the top facer comprises a plurality of top facer sections positioned side-by-side one another.

2. The method of claim 1, wherein the strips of hook fastener layer material are positioned in parallel to one another.

3. The method of claim 1, wherein the strips of hook fastener layer material are positioned spaced inwardly from side edges of the insulation board.

4. The method of claim 1, wherein adhesive is applied on top of the insulation board in sections that are side-by-side one another and spaced apart from one another such that the strips of hook fastener layer material are positioned on top of the spaced apart sections of adhesive.

5. The method of claim 1, wherein the strips of hook fastener layer material are positioned side-by-side one another with an intermediate hook layer strip therebetween, and wherein the intermediate hook layer strip is adhered to edges of the side-by-side top facer sections.

6. The method of claim 1, wherein the strips of hook fastener layer material are positioned side-by-side one another and offset from edges of the side-by-side top facer sections below, and wherein an edge of one strip of hook fastener layer material is adhered to an edge of one of the top facer sections below.

7. The method of claim 1, wherein a side edge of one top facer section overlaps a side edge of another top facer section, and wherein the side edges of the top facer sections are adhered together, and wherein a separate strip of hook fastener layer material is positioned on top of each of the top facer sections.

8. The method of claim 1:
wherein the strips of hook fastener layer material are taped together, and
wherein the top facer sections are taped together.

9. The method of claim 1, wherein the top facer is placed adjacent to a bottom of the laminator and the bottom facer is positioned adjacent to a top of the laminator.

10. The method of claim 1, wherein the layer of hook fasteners is made of a polypropylene film.

11. A method of attaching a layer of hook fasteners onto a top of an insulation board, comprising:
(a) providing a top facer comprising a plurality of top facer sections positioned side-by-side one another;
(b) adhering the layer of hook fasteners onto the top facer, wherein the layer of hook fasteners comprises a plurality of strips of hook fastener layer material positioned side-by-side one another; and
(c) adhering the top facer onto the insulation board.

12. The method of claim 11, wherein the strips of hook fastener layer material are positioned side-by-side one another with an intermediate hook layer strip therebetween, and wherein the intermediate hook layer strip is adhered to edges of the side-by-side top facer sections.

13. The method of claim 11, wherein the strips of hook fastener layer material are positioned side-by-side one another and offset from the edges of the side-by-side top facer sections below, and wherein an edge of one strip of hook fastener layer material is adhered to an edge of one of the top facer sections below.

14. The method of claim 11, wherein a side edge of one top facer section overlaps a side edge of another top facer section, and wherein the side edges of the top facer sections are adhered together, and wherein a separate strip of hook fastener layer material is positioned on top of each of the top facer sections.

15. The method of claim 11:
wherein the strips of hook fastener layer material are taped together, and
wherein the top facer sections are taped together.

16. A method of attaching a layer of hook fasteners onto a top of an insulation board, comprising:
(a) providing a bottom facer;
(b) providing the insulation board;
(c) providing the layer of hook fasteners; and
(d) simultaneously passing the insulation board, the bottom facer and the layer of hook fasteners through a laminator, wherein the laminator heats and seals the bottom facer to a bottom of the insulation board and the layer of hook fasteners directly to the top of the insulation board, and wherein there is no facer between the layer of hook fasteners and the top of the insulation board.

17. The method of claim 16, wherein the bottom facer is placed adjacent to a top of the laminator and the layer of hook fasteners is positioned adjacent to a bottom the of the laminator.

18. The method of claim 16, wherein the layer of hook fasteners is made of a polypropylene film.

19. A method of attaching a layer of hook fasteners onto a top of an insulation board, comprising:
(a) providing a bottom facer;
(b) providing the insulation board;
(c) providing the layer of hook fasteners; and
(d) simultaneously passing the insulation board, the bottom facer and the layer of hook fasteners through a laminator, wherein the laminator heats and seals the bottom facer to a bottom of the insulation board and the layer of hook fasteners to the top of the insulation board, wherein the layer of hook fasteners comprises a plurality of strips of hook fastener layer material adhered to a plurality of top facer sections, wherein the strips of hook fastener layer material are positioned side-by-side one another with an intermediate hook layer strip therebetween, and wherein the intermediate hook layer strip is adhered to edges of the side-by-side top facer sections.

20. A method of attaching a layer of hook fasteners onto a top of an insulation board, comprising:
(a) providing a bottom facer;
(b) providing the insulation board;
(c) providing the layer of hook fasteners; and
(d) simultaneously passing the insulation board, the bottom facer and the layer of hook fasteners through a laminator, wherein the laminator heats and seals the bottom facer to a bottom of the insulation board and the layer of hook fasteners to the top of the insulation board, wherein the layer of hook fasteners comprises a plurality of strips of hook fastener layer material adhered to a plurality of top facer sections, wherein the strips of hook fastener layer material are positioned side-by-side one another and offset from edges of the side-by-side top facer sections below, and wherein an edge of one strip of hook fastener layer material is adhered to an edge of one of the top facer sections below.

21. A method of attaching a layer of hook fasteners onto a top of an insulation board, comprising:
- (a) providing a bottom facer;
- (b) providing the insulation board;
- (c) providing the layer of hook fasteners; and
- (d) simultaneously passing the insulation board, the bottom facer and the layer of hook fasteners through a laminator, wherein the laminator heats and seals the bottom facer to a bottom of the insulation board and the layer of hook fasteners to the top of the insulation board, wherein the layer of hook fasteners comprises a plurality of strips of hook fastener layer material adhered to a plurality of top facer sections, wherein a side edge of one top facer section overlaps a side edge of another top facer section, and wherein side edges of the top facer sections are adhered together, and wherein a separate strip of hook fastener layer material is positioned on top of each of the top facer sections.

22. A method of attaching a layer of hook fasteners onto a top of an insulation board, comprising:
- (a) providing a bottom facer;
- (b) providing the insulation board;
- (c) providing the layer of hook fasteners; and
- (d) simultaneously passing the insulation board, the bottom facer and the layer of hook fasteners through a laminator, wherein the laminator heats and seals the bottom facer to a bottom of the insulation board and the layer of hook fasteners to the top of the insulation board, wherein the layer of hook fasteners comprises a plurality of strips of hook fastener layer material adhered to a plurality of top facer sections, wherein the strips of hook fastener layer material are taped together, and wherein the top facer sections are taped together.

\* \* \* \* \*